United States Patent
Arhab et al.

(10) Patent No.: US 6,830,136 B2
(45) Date of Patent: Dec. 14, 2004

(54) HYDROKINETIC COUPLING APPARATUS, IN PARTICULAR FOR MOTOR VEHICLE, COMPRISING A NEEDLE THRUST BEARING BETWEEN THE PISTON AND THE TURBINE HUB

(75) Inventors: Rabah Arhab, Saint-Brice-Sous-Foret; Daniel Satonnet, Paris (FR); Norbert Termenon, Amiens (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 10/048,837

(22) PCT Filed: Jun. 28, 2001

(86) PCT No.: PCT/FR01/02078

§ 371 (c)(1),
(2), (4) Date: Feb. 6, 2002

(87) PCT Pub. No.: WO02/01091

PCT Pub. Date: Jan. 3, 2002

(65) Prior Publication Data

US 2002/0104727 A1 Aug. 8, 2002

(30) Foreign Application Priority Data

Jun. 29, 2000 (FR) .......................................... 00 08430

(51) Int. Cl.⁷ .............................................. F16H 45/02
(52) U.S. Cl. ............... 192/3.29; 192/109 R; 192/110 B
(58) Field of Search .......................... 192/3.29, 110 B, 192/109 R, 3.3; 384/622

(56) References Cited

U.S. PATENT DOCUMENTS

| | | | | |
|---|---|---|---|---|
| 4,733,979 A | * | 3/1988 | Tsuruki | 384/622 |
| 4,926,988 A | * | 5/1990 | Kundermann | 192/3.3 |
| 4,981,373 A | * | 1/1991 | Bando | 384/622 |
| RE34,813 E | * | 12/1994 | Gardella | 384/622 |
| 6,293,380 B1 | * | 9/2001 | Arhab | 192/3.29 |
| 6,354,413 B2 | * | 3/2002 | Heller et al. | 192/3.29 |
| 6,378,676 B1 | * | 4/2002 | Chasseguet et al. | 192/3.29 |

FOREIGN PATENT DOCUMENTS

| | | | |
|---|---|---|---|
| FR | 2 782 363 B | 2/2000 | |
| FR | 2 782 363 A | 2/2000 | |
| WO | WO 00/03158 | * 1/2000 | ........... F16H/45/02 |
| WO | WO 00/19126 | * 5/2000 | ........... F16H/45/02 |

* cited by examiner

Primary Examiner—Saul Rodriguez
(74) Attorney, Agent, or Firm—Liniak, Berenato & White (57) ABSTRACT

The invention concerns a hydrokinetic apparatus, in particular for motor vehicle, comprising a casing (10); a turbine wheel (16) secured in rotation to a hub (30); a lock-clutch comprising a piston (50) whereof the radially inner part (54) is mounted sliding along an outer cylindrical shaft (58) belonging to the central ring called piston (50, 54) whereof a rear end surface (64) extends opposite a transverse surface belonging to the turbine wheel (16)/hub (30, 86) assembly, and comprising stop means (84) axially interposed between the central ring and the turbine wheel/hub assembly. The invention is characterised in that are provided radial centering means for axial stop (84) relative to the hub (30, 5) or relative to the piston (50, 54) or relative to the web (104).

17 Claims, 7 Drawing Sheets

HYDROKINETIC COUPLING APPARATUS, IN PARTICULAR FOR MOTOR VEHICLE, COMPRISING A NEEDLE THRUST BEARING BETWEEN THE PISTON AND THE TURBINE HUB

BACKGROUND OF THE INVENTION

1. Field of the Invention

The present invention relates to hydrokinetic coupling apparatus, especially for a motor vehicle.

More particularly, the invention relates to a hydrokinetic coupling apparatus of the type comprising a casing having a generally transversely oriented wall adapted to be coupled in rotation to a driving shaft, a turbine wheel including an internal plate element and coupled in rotation to a hub which is adapted to be coupled in rotation to a driven shaft, a lock-up clutch interposed between the turbine wheel and the transverse wall, and comprising, in particular, arranged axially between the turbine wheel and the transverse wall, a generally transversely oriented piston, the radially inner portion of which is mounted for sliding movement along a cylindrical outer surface of a central sleeve, which is referred to as a guide sleeve for the piston, and an annular, transverse rear end face of which lies facing a front transverse face of the assembly consisting of the turbine wheel and hub.

2. Description of Related Art

One example of a hydrokinetic coupling apparatus of this kind is described and shown in the document FR-A-2 634 849 or U.S. Pat. No. 4,926,988.

In this type of design it is firstly necessary to provide an abutment for limiting the axial displacements of the piston towards the turbine wheel, and secondly to provide an abutment element acting as a spacer, which is interposed between the central sleeve and the hub of the turbine wheel, so as to determine a precise axial position between these two elements, and also in order to reduce to a minimum friction effects between these two elements, one of which rotates with respect to the other.

In the design according to the state of the art as constituted by the documents cited above, the piston abutment consists of an annular ring which is fitted in a groove formed in the central sleeve, while the spacer abutment between the central sleeve and the turbine wheel hub is an additional component which is made for example in the form of a washer.

This design is accordingly complex, in that it includes two components and necessitates, for the abutment for the piston, an additional machining operation in the central sleeve.

In order to overcome these drawbacks, the document FR-A-2 782 362 proposed thrust bearing means which are interposed axially between the annular transverse rear end face of the central sleeve and the said front transverse face of the assembly consisting of the turbine wheel and hub, whereby to limit friction between the said two elements that are rotatable with respect to each other, a portion of the thrust bearing being disposed facing a rear transverse face of the radially inner portion of the piston, so as to constitute an axial abutment defining the maximum rearward position of the piston when the clutch is disengaged.

In the design proposed in that document, the abutment means are made in the form of a single one-piece component which is interposed axially between the central sleeve and the hub of the turbine wheel, and the radial size of this component is such that it performs both of the abutment functions mentioned above at the same time.

This single abutment component is preferably made in a material having optimum friction characteristics so as to reduce friction between the rotating parts.

However, this design is not entirely satisfactory since the abutment is not positioned, especially in the radial direction. In addition, the compromise in the selection of a material having good enough ability to reduce friction, while being strong enough not to wear rapidly, is hard to optimise.

SUMMARY OF THE INVENTION

In order to provide a remedy for this disadvantage, the invention proposes a hydrokinetic coupling apparatus of the type mentioned above, characterised in that radial centring means are provided for centring the axial abutment with respect to the hub or with respect to the piston or with respect to the plate element.

Thanks to the invention, the axial abutment is centred in the radial direction. Preferably, the abutment means consist of an axial bearing with rolling elements, which is interposed axially between the annular transverse rear end face of the central sleeve and the said transverse front face of the assembly consisting of the turbine wheel and hub, and in that [sic] at least one ring of the axial thrust bearing includes a radially oriented annular portion which lies facing the said transverse rear face of the radially inner portion of the piston.

Because of this design, abutment means are provided which have reduced friction and high reliability, the design of which, since it makes use of one or two rings between which the rolling elements are arranged, offers numerous possibilities for the arrangement of this axial thrust bearing with rolling elements between the various components.

The axial thrust bearing is preferably a needle bearing.

According to further features of the invention:

- the axial thrust bearing has at least one front ring interposed axially between the central sleeve and the rolling elements, and extending in a generally radial direction and in facing relationship with the said annular transverse rear end face of the central sleeve, the said front ring having an annular extension extending radially outwards beyond the ring and having a transverse front face in facing relationship with the said transverse rear face of the radially inner portion of the piston;

- the hub includes a radially oriented plate portion extending outwards, and in that [sic] the said axial thrust bearing is disposed facing the transverse front face of the said plate portion;

- the turbine wheel includes a generally radially oriented inner plate element or is connected to such a plate element, which is fixed to the plate portion of the hub;

- the plate element of the turbine wheel is adjacent to the transverse front face of the plate portion of the hub;

- the plate element of the turbine wheel is interposed axially between the plate portion of the hub and the axial thrust bearing;

- the axial thrust bearing includes a rear ring interposed axially between the assembly consisting of the turbine wheel and hub;

- the rear ring of the axial thrust bearing is centred radially with respect to the plate portion of the hub, or with respect to the said plate element of the turbine wheel;

the rear ring of the axial thrust bearing is centred radially outwardly with respect to the inner periphery of the said plate element;

the rear ring of the axial thrust bearing is centred radially inwardly with respect to the plate portion of the hub;

the front ring of the axial thrust bearing is centred radially with respect to the central sleeve;

the front ring of the axial thrust bearing is centred radially with respect to the radially inner portion of the piston;

one ring of the axial thrust bearing is coupled in rotation to the turbine wheel, or to the central sleeve, or to the piston;

the axial thrust bearing is attached axially to the turbine wheel, or to the central sleeve, or to the piston.

BRIEF DESCRIPTION OF THE DRAWINGS

Further features and advantages of the invention will appear on a reading of the following description, for an understanding of which, reference will be made to the attached drawings, in which.

DETAILED DESCRIPTION OF THE PREFERRED EMBODIMENTS

In the following description those components which are identical, similar or analogous will be designated by the same reference signs.

Figure 1:
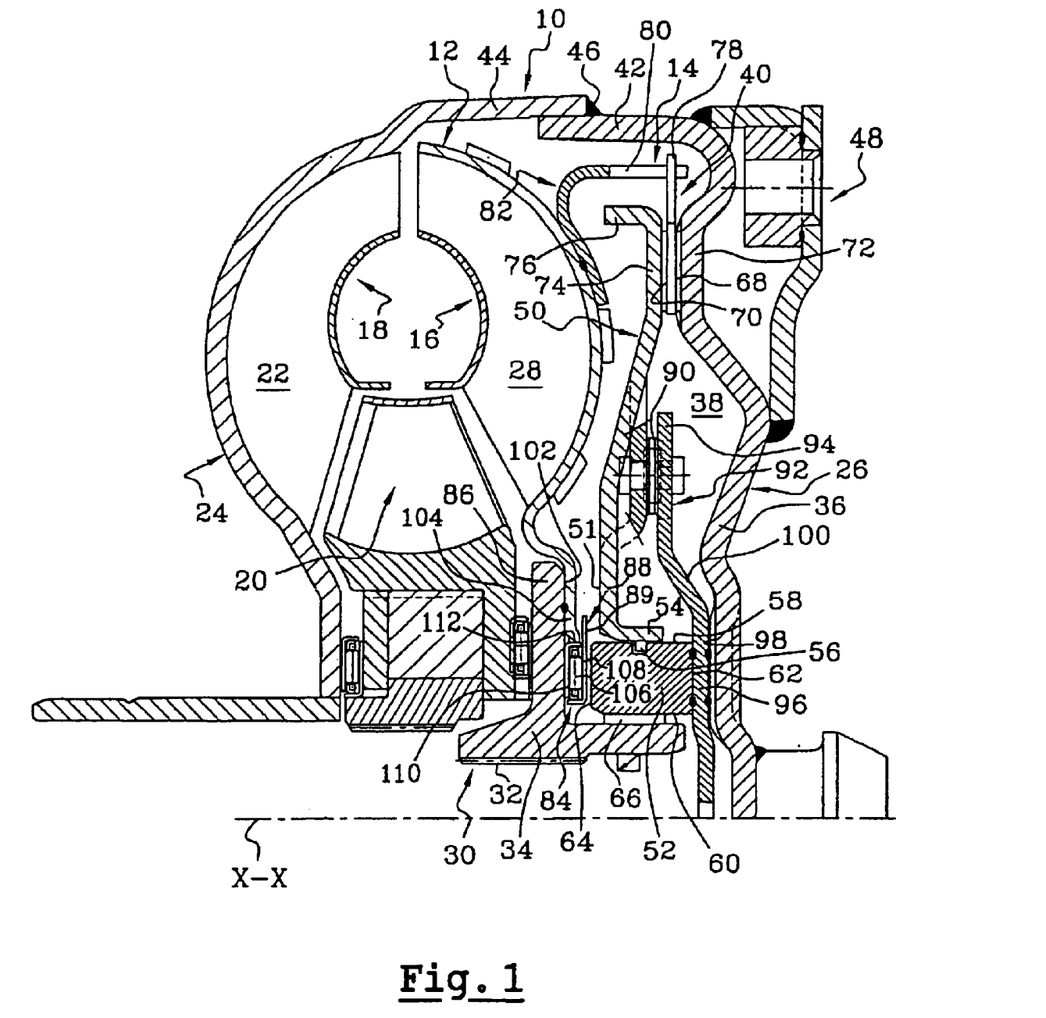
FIG. 1 is a half view in axial cross section of a hydrokinetic coupling apparatus which includes an axial thrust bearing made and arranged in accordance with a first embodiment of the invention.

To facilitate understanding of the description and Claims, there will be used, by way of non-limiting example, rear and front orientations which correspond respectively to the left and right hand sides of FIG. 1 and similar Figures.

As is known in the state of the art, a hydrokinetic coupling apparatus includes, arranged in a common sealed housing 10 filled with oil and constituting a casing, a torque converter 12 and a lock-up clutch 14.

The torque converter 12 comprises a turbine wheel 12, an impulse wheel 18 and a reaction wheel 20.

The impulse wheel 18 has blades 22 which are carried by a first half shell 24, which is sealingly secured to a driving second half shell 26 arranged to be coupled in rotation to a driving shaft.

The turbine wheel 16 also has blades 28 which face towards the blades 22 of the impulse wheel 18, and the turbine wheel 16 is coupled in rotation to a hub 30 which is arranged to be coupled in rotation to a driven shaft (not shown) coaxial with the axis X—X of the apparatus, by means of splines 32 formed on the inner periphery of the radially inner portion 34 of the hub 30.

The driving half shell 26 consists essentially of a generally transversely oriented wall 36, that is to say this wall lies in a radial plane at right angles to the axis X—X.

As can be seen in particular in FIG. 1, the turbine wheel 16 is fitted axially between the transverse driving wall 36 at the front and the impulse wheel 22 at the rear.

The lock-up clutch 14 is fitted axially between the assembly that consists of the turbine wheel 16 with its hub 30, on the one hand, and the transverse front driving wall 36 on the other hand.

The two half shells, the rear one 24 and front one 26, constitute the sealed casing or housing 10 which, by means of its driving front half shell 26, constitutes the input element of the hydrokinetic coupling apparatus, while the hub 30 of the turbine wheel 60 is the output element of the apparatus.

In the case of application to a motor vehicle, the driving shaft consists of the crankshaft of the internal combustion engine of the vehicle (not shown), while the driven shaft consists of the input shaft of the transmission of the vehicle (not shown).

The said driven shaft has a central hole to act as a channel for feeding hydraulic fluid under pressure to a variable control chamber 38 which is delimited by the components of, firstly, the lock-up clutch 14, which comprise an annular disc 40 coupled in rotation releasably to the assembly consisting of the turbine wheel 16 and its hub 30.

During starting of the vehicle, the turbine wheel 16 is driven in rotation by the impulse wheel 18 by the flow of the oil contained in the sealed casing 10 between the blades 28 of the turbine wheel 16 and the blades 22 of the impulse wheel 18.

The lock-up clutch 14 is then disengaged, and the torque converter 12 is in service or in operation.

In order to avoid a loss of power which is due in particular to sliding effects between the turbine wheel 16 and impulse wheel 18, the turbine wheel 16 is subsequently, after starting of the vehicle, coupled solidly to the driving front half shell 26 through the lock-up clutch 14, which is therefore engaged, the converter 12 being then out of service.

In particular, reference may be made to the contents of the document WO-A-94/07.058 to find further details relating to the known structure and operation of a hydrokinetic coupling apparatus of this kind.

The driving front half shell 26 is a metal pressing, and it includes at its radially outer periphery an axially oriented annular flange which extends towards the rear, and which in this example is received radially within a complementary axially oriented annular flange 44 which is part of the rear half shell 24, for assembly and closing of the sealed housing or casing 10, for example by means of a weld seam 46.

As can be seen in particular in FIG. 1, the front transverse wall 36 of the driving half shell 26 is continuous in its central part, that is to say it has no machined aperture, nor any integral hole.

The construction of the driving front half shell 26 is therefore particularly simple, simply obtained by press-forming, and because of its design it is generally sealed because it has no central hole or other peripheral hole, for example for carrying out fastening operations by riveting internal components to the housing 10.

As can be seen in FIG. 1, the transverse front wall 36 carries, close to its periphery, elements 48 for coupling the half shell 26 in rotation to the crankshaft of the engine of the vehicle in a known way, by means of an interposed face plate not shown in the drawings.

The lock-up clutch 14 comprises a piston 50 which is a component having the general form of a transversely oriented disc with a central hole, and which is mounted for axial movement in both directions and in sealed sliding movement on a central annular sleeve 52, called a guide sleeve, for guiding the piston, although guidance in axial displacement and in sealed sliding movement of the piston are ensured in this case by tongues.

For this purpose, the piston 50 includes a radially inner portion 54 made in the form of an axially oriented annular tube element which is mounted for sliding movement, with a sealing ring 56 interposed, on a cylindrical convex bearing surface constituted by the outer peripheral wall of the sleeve 52.

In the embodiments shown in succession in FIGS. 1 to 16, the design of the central sleeve is particularly simple, and is in the form of a monobloc cylindrical annular sleeve which is delimited radially by an outer peripheral surface 58 and a concave internal cylindrical surface 60, and, axially, by two annular transverse end faces, namely a front face 62 and a rear face 64.

The centering sleeve 62, by virtue of its concave radially inner surface 60, guides the turbine wheel 16 in rotation with respect to the hub 30, with a sleeve bearing 66 interposed.

Thus, the piston 50, with the central sleeve 52 and the transverse front end wall 36, delimits the variable volume control chamber 38 which is delimited radially on the outside by the disc 40 and by the front friction disc 68 and rear friction disc 70, which are adapted to be gripped respectively between the disc or annular ring 40 and the facing, radially outward, portion 72 of the transverse wall 36, on the one hand, and between the disc 40 and the facing, radially outer, portion 74 of the piston 50.

Each friction liner 68, 70 is coupled to one of the elements of the assembly 36, 40, 50, and the two liners 68 and 70 may for example be carried by the opposed transverse faces of the disc 40.

The disc 40 is the output element of the lock-up clutch 14, and in this example it extends radially outwards beyond the annular peripheral portion 76 of the piston, that is to say radially outside the piston with reference to FIG. 1.

As in a known arrangement, the radially outer periphery 78 of the disc 40 meshes with an axially oriented complementary portion 80 of a member 82 which is coupled in rotation to the turbine wheel 16, in this example by welding.

It is of course possible to provide an elastic damping device disposed at the periphery of the clutch 14, of the type comprising for example circumferentially acting springs.

When the clutch 14 is engaged, the turbine wheel 16 is coupled to the transverse wall 36 of the front half shell 26, so that either no relative movement takes place between the turbine wheel 16 and impulse wheel 18, or else, if sliding movement does occur, it is limited as a function of the axial engagement of the clutch.

When the clutch 14 is engaged, the turbine wheel 16 is driven in rotation by the impulse wheel 18.

In the known way, the piston 50 is coupled in rotation to the transverse wall 36, which turns and is fixed axially by means of generally tangentially oriented resilient tongues 90, which are fixed to a driving or coupling member 92 so that the piston 50 is coupled in rotation to the transverse wall 36, while being displaceable axially in both directions with respect to the latter by sliding axial movement along the central sleeve 52, 58.

In the various examples shown in the drawings, the resilient tongues 90 are oriented tangentially, and they are riveted at one of their tangential ends to the piston 50, and at their other tangential end, opposed to the first, to the coupling or driving member 92.

As can be seen in the drawings, the coupling member 92 is generally in the form of a generally radially or transversely oriented annular disc, and it has peripheral lugs 94 to which the corresponding tangential ends of the tongues 90 are fixed.

The tongues 90 and the coupling disc 92 are disposed axially between the piston 90 and the front transverse wall 36, that is to say within the variable volume control chamber 38.

Because of the arrangement of the complementary portions 78 and 80, and because they are meshed together, the disc 40 is coupled in rotation to the turbine wheel 60, but it is displaceable axially with respect to the latter in such a way as to enable it to be gripped axially under the action of the piston 50.

The radially outer lugs 94 of the coupling disc 92 lie in a radial plane which is offset axially towards the rear with respect to the central portion 96 of the coupling member 92, this central portion being in the form of an annular ring portion which is interposed axially between the central sleeve 52 and a facing internal annular surface portion 98 of the front transverse wall 36 which is oriented axially towards the rear.

The lugs 94 are connected to the central portion 96 by means of a frustoconical intermediate annular portion 100.

The central portion 96 of the coupling disc 92 is fixed to the transverse wall 36 by welding, while the central sleeve 52 is also welded to the central portion 96 of the coupling disc 92.

With particular reference to FIG. 1, it can be seen that, in accordance with the features of the invention, a needle bearing 84 is interposed axially between the rear annular transverse end face 64 of the central sleeve 52 and the hub 30.

More precisely, the bearing 84 is interposed between the central sleeve 52, 64 and a radial plate portion 86 which is an outward radial extension of the hub and on which the turbine wheel 16 is secured, by welding in this case or, in another version, by riveting.

The front ring 108 of the needle bearing 84 is extended radially outwards by a ring 88 which acts as an axial rear-facing thrust element for the piston 50.

More precisely, the transverse plate portion 86 of the hub extends radially outwards and is delimited axially at the front by a front transverse annular face 102, against which an internal radial plate element 104, connecting the turbine wheel 16 to the hub 30, bears axially at the rear, the plate element 104 being, in this non-limiting example, made in the form of a radially inner portion of the shell of the turbine wheel 16.

The inner radial plate element 104 is fixed to the plate portion 86 by welding, but it can of course be fixed in any other way, for example by adhesive bonding or riveting in a known way.

The needle bearing 84 is a thrust bearing in which the needles which are the rolling elements 106 are disposed radially with respect to the axis X—X, and are located between two rings, namely the front ring 108 and rear ring 110, each of which is mainly in the form of a radial plate portion with an axially oriented annular portion, which is on the radially inner side of the front ring 108 and the radially outer side on the rear ring 110.

The axial thrust needle bearing 84 is therefore a component which is interposed axially between the rear transverse annular face 64 of the central sleeve 52 and a facing portion of the transverse front face 102 of the plate portion 86 of the hub 30.

In the first embodiment shown in FIG. 1, the needle thrust bearing 84 is centred radially within the radially inner peripheral edge 112 of the plate element 104 of the turbine wheel.

The needle bearing 84 is preferably mounted by means of its rear ring 110, which is lightly gripped within the plate element 104, so that it is coupled in rotation, and attached axially to, the assembly consisting of the turbine wheel 16, 104 and the hub 30, 86.

However, without departing from the scope of the invention, it is not essential that the thrust bearing be coupled in rotation and/or attached axially.

As to the thrust ring 88, this is a radially outward extension of the plate portion of the front ring 108 of the bearing 84, extending radially over a distance such that the ring 88 is situated, through its front transverse annular face 89, in facing relationship with the facing portion of the transverse rear face 51 of the piston 50, which is adjacent to its radially inner guide tube element 54.

Because it is in the form of an extension of the front ring 108, the ring 88, acting as an abutment for the piston 50, is also slightly elastic so as to absorb shocks when the piston 50 makes contact with the thrust bearing.

Figure 2:
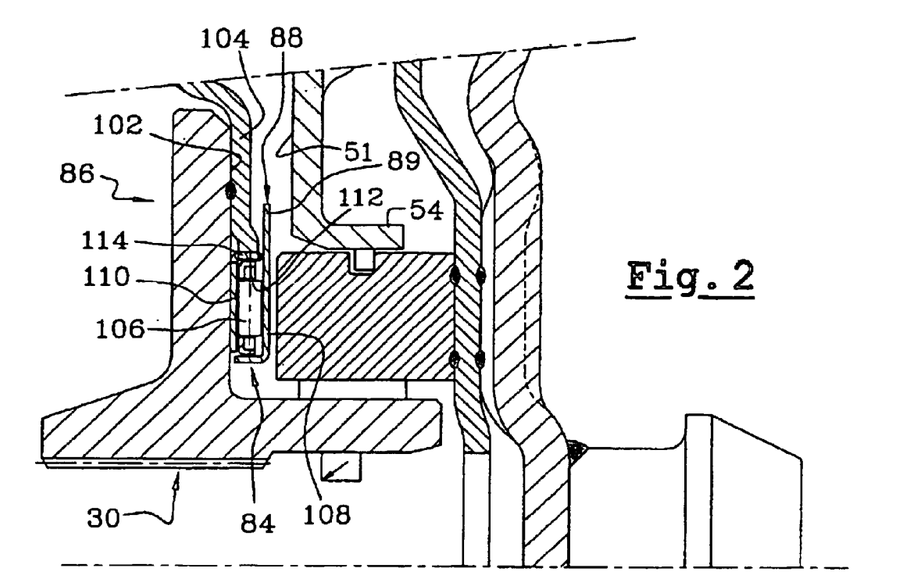
FIG. 2 is a scrap view on a larger scale, showing the lower right hand part of FIG. 1, in a second embodiment of the invention.

The second embodiment shown in FIG. 2 is identical to the first embodiment, except for the means coupling the needle bearing 84 in rotation with the hub 30 and the radial plate element 104, which are provided by complementary teeth formed in the radially inner edge 112 of the plate element 104 and in the axially oriented radially outer portion 114 of the rear ring 110 of the thrust bearing 84.

Figure 3:
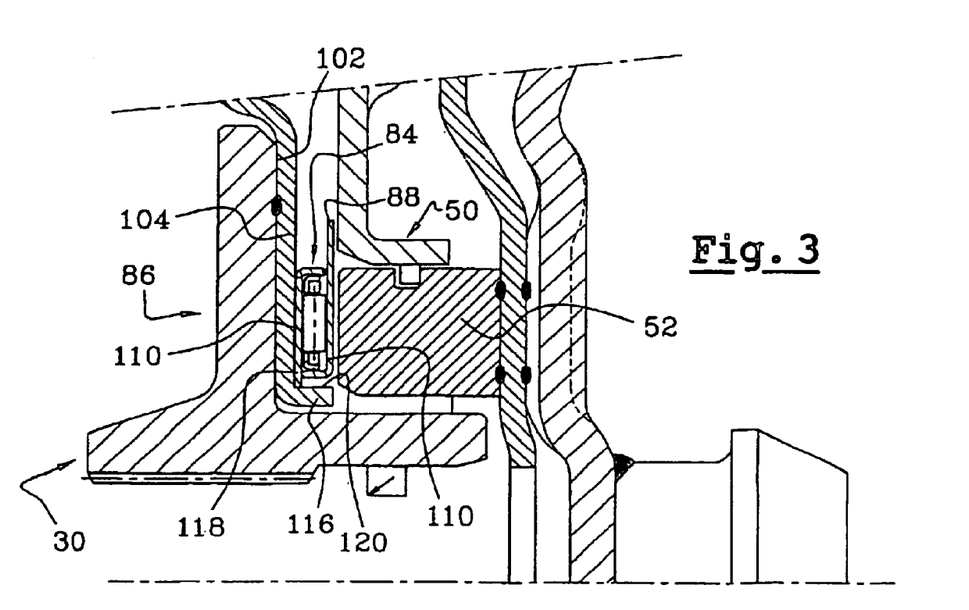
FIGS. 3 to 11 are views similar to that in FIG. 2, and show the third to eleventh embodiments of the invention.

In the third embodiment shown in FIG. 3, it can be seen that the plate element 104 is extended radially inwards along the whole of the annular front transverse face 102 of the plate portion 86 of the hub 30, and that it is extended by a radially inner, axially oriented tube element 116 extending towards the rear.

The needle thrust bearing 84, the design of which is generally similar to that of the thrust bearing used in the first and second embodiments, is thus interposed axially between the central sleeve 82 and the plate portion 86 of the hub 30, with the radially inner plate portion 104 of the turbine wheel 16 being interposed.

For radial centring of the needle thrust bearing 84, in this case it is the plate portion of its rear ring 110 that includes the transverse, radially inward, extension 118 which is centred on the outer peripheral surface 120 of the tube element 116, and fitting may or may not involve a slight gripping, so as to couple the rear ring 110 in rotation with the hub 30.

Figure 4:
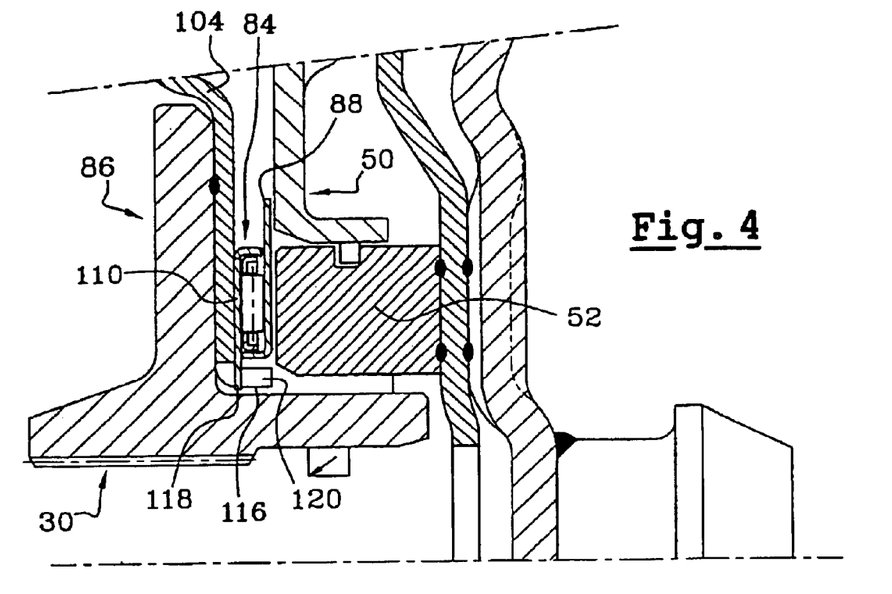

The fourth embodiment shown in FIG. 4 is a variant of the third embodiment, in which the rear ring 110 is driven in rotation by means of meshing lugs formed in the extension 118 of the plate portion of the rear ring 110 with complementary notches 120 formed in the tube element 116.

Figure 5:
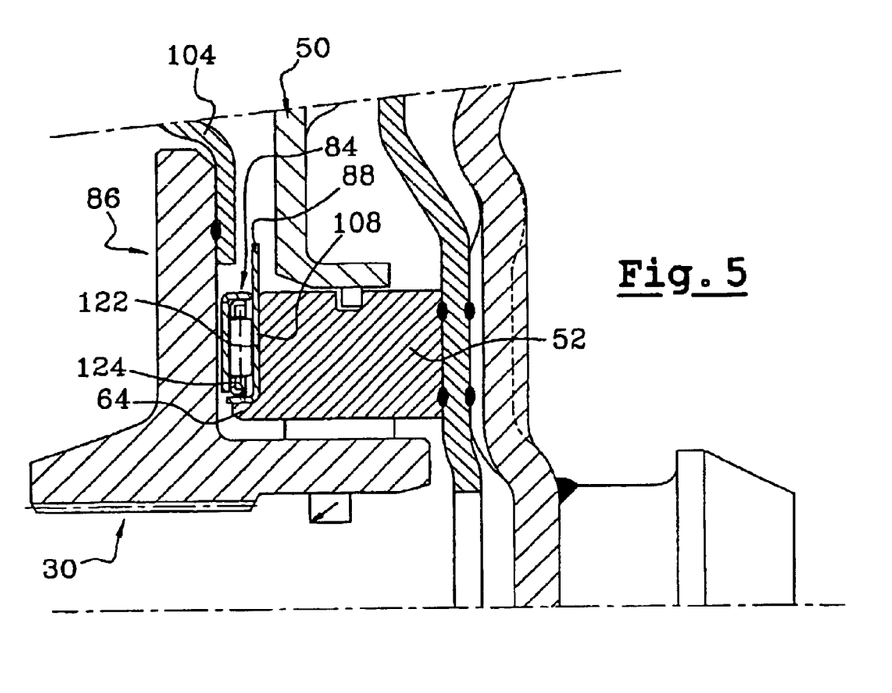

In the fifth embodiment shown in FIG. 5, the needle thrust bearing 84 is carried by the central sleeve 52, the annular rear transverse end face 64 of which includes for this purpose a seating bounded by a transverse face 122 and a convex cylindrical surface 124, the seating thus formed being open axially towards the rear to enable the thrust bearing 84 to be fitted, the front ring 108 of the latter being engaged within the seating, with, if need be, a slight radial gripping effect such as to couple it in rotation with the central sleeve 52.

Figure 6:
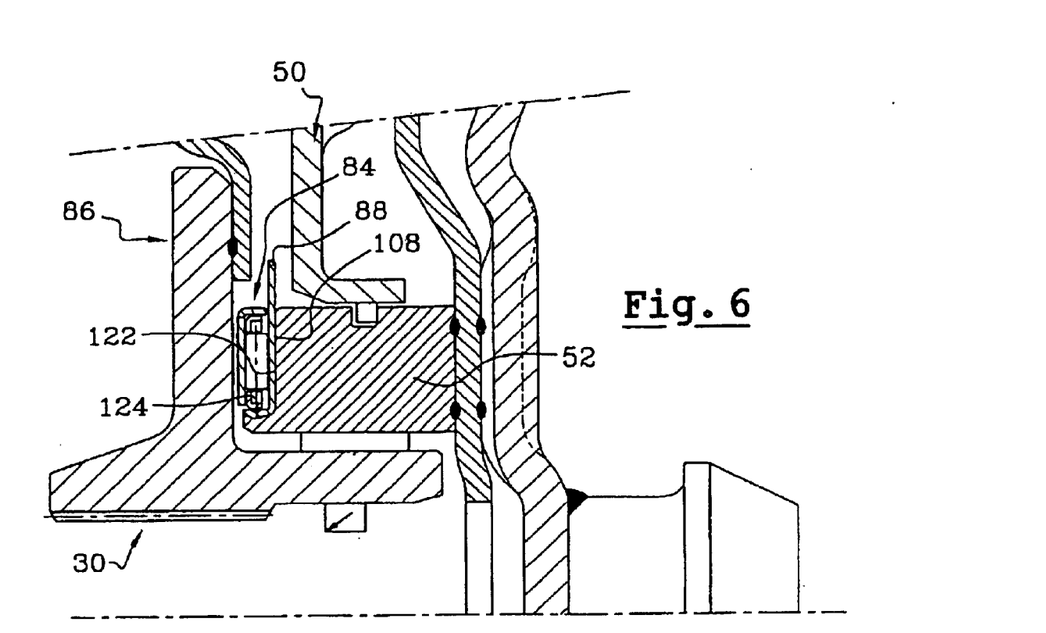

The sixth embodiment shown in FIG. 6 is a variant of the fifth embodiment, in which the front ring 108 of the needle bearing 84 is fitted elastically within the seating 122, 124 of the central sleeve 52, complementary profiles being formed for this purpose in the axially oriented radially inner portion of the front ring 108 and in the surface 124.

Figure 7:
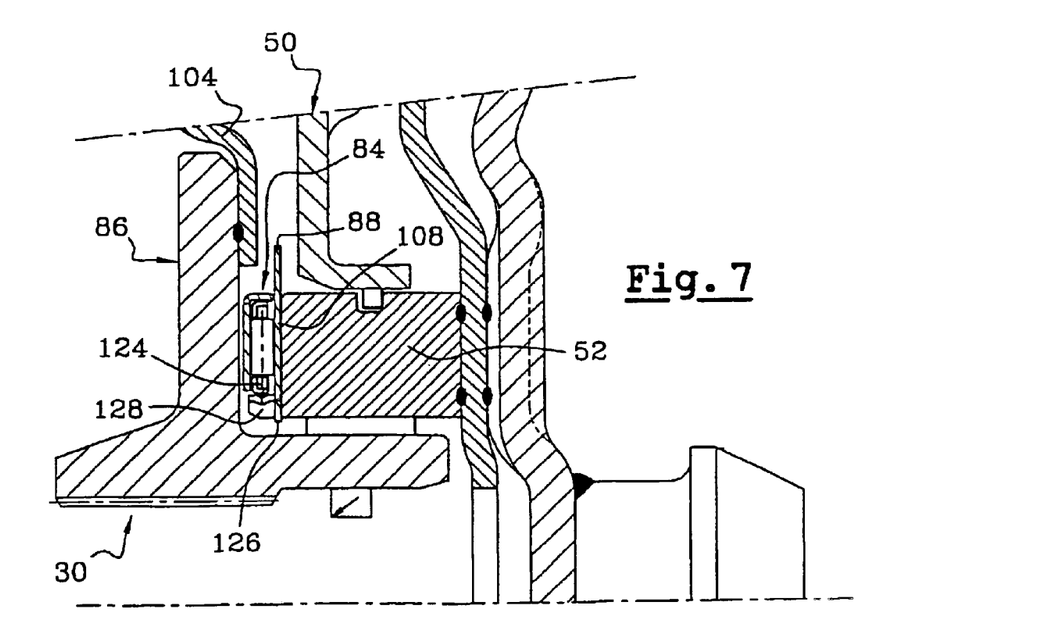

The seventh embodiment shown in FIG. 7 is a variant of the sixth embodiment, in which the plate portion of the front ring 108 includes a radial inward extension 126 in the form of radially oriented lugs which are received in notches formed in the sleeve 52 in alignment with the bearing surface 124.

Thus, the needle thrust bearing 84 is attached axially to the central sleeve 52 by elastic insertion, and is itself coupled in rotation by a meshing mechanism consisting of the lugs 126 and notches 128.

Figure 8:
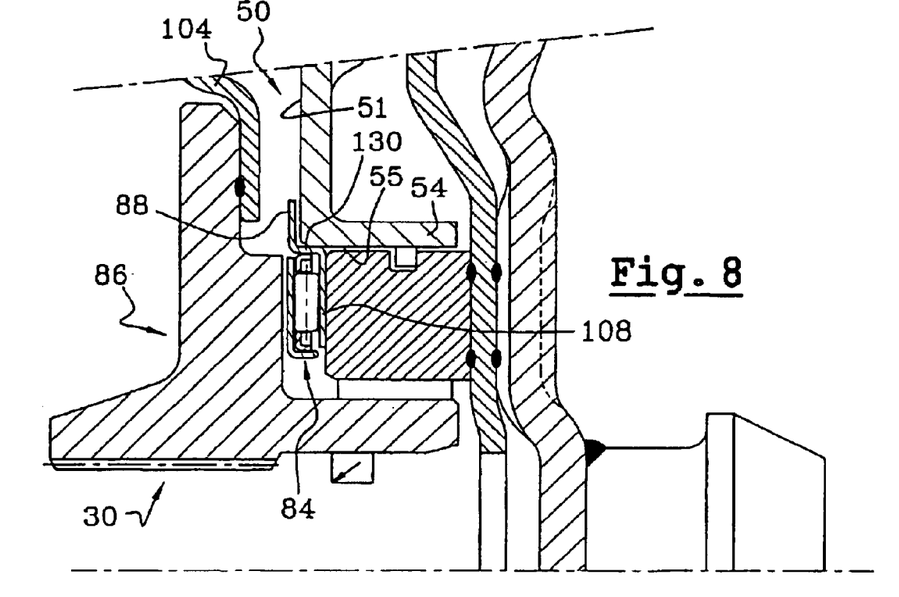

In the eighth embodiment shown in FIG. 8, the needle thrust bearing 84 is centred radially with respect to the piston 50.

More precisely, the transverse plate portion of the front ring 108 is extended axially towards the rear by a centring tube element 130 which is received within the concave cylindrical surface 55 of the guide tube element 54 of the piston 50, and it is then extended radially outwards by the thrust ring 88.

There is of course a slight radial clearance between the tube element 130 and the tube element 54, so as to leave the piston 50 free for axial displacements.

Figure 9:
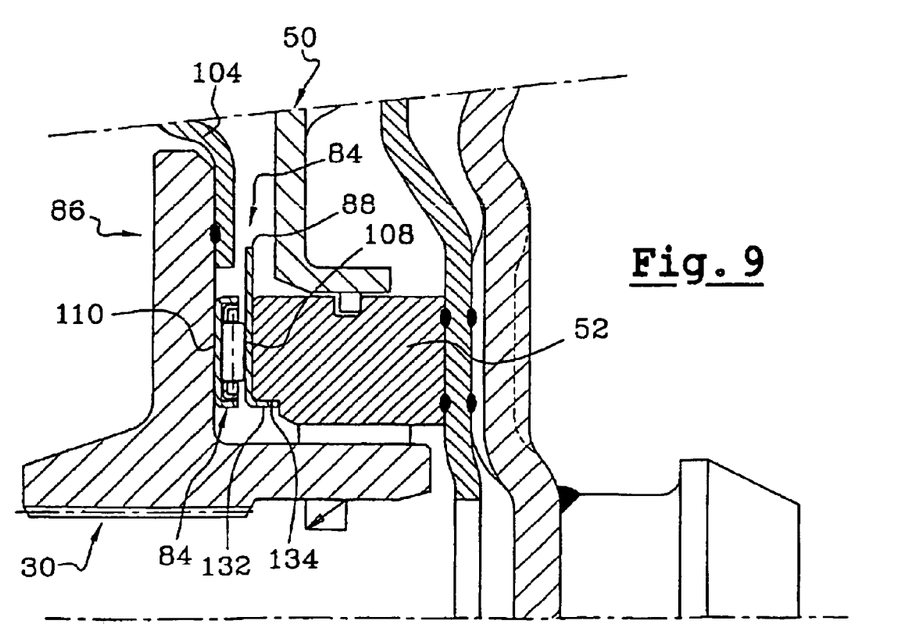

In the ninth embodiment shown in FIG. 9, the needle thrust bearing 84 is centred radially with respect to the central sleeve 52, to which it is also attached axially.

To this end, the plate portion of the front thrust ring 108 includes, at its radially inner periphery, an annular centring tube element 132 which extends axially towards the rear and is centred on a complementary concave cylindrical surface 134 formed at the inner periphery and at the rear axial end of the central sleeve 52.

To couple the front ring 108 and the central sleeve 52 together in rotation, fitting of the tube element 132 on the surface 134 may be made with a slight radial interference.

Figure 10:
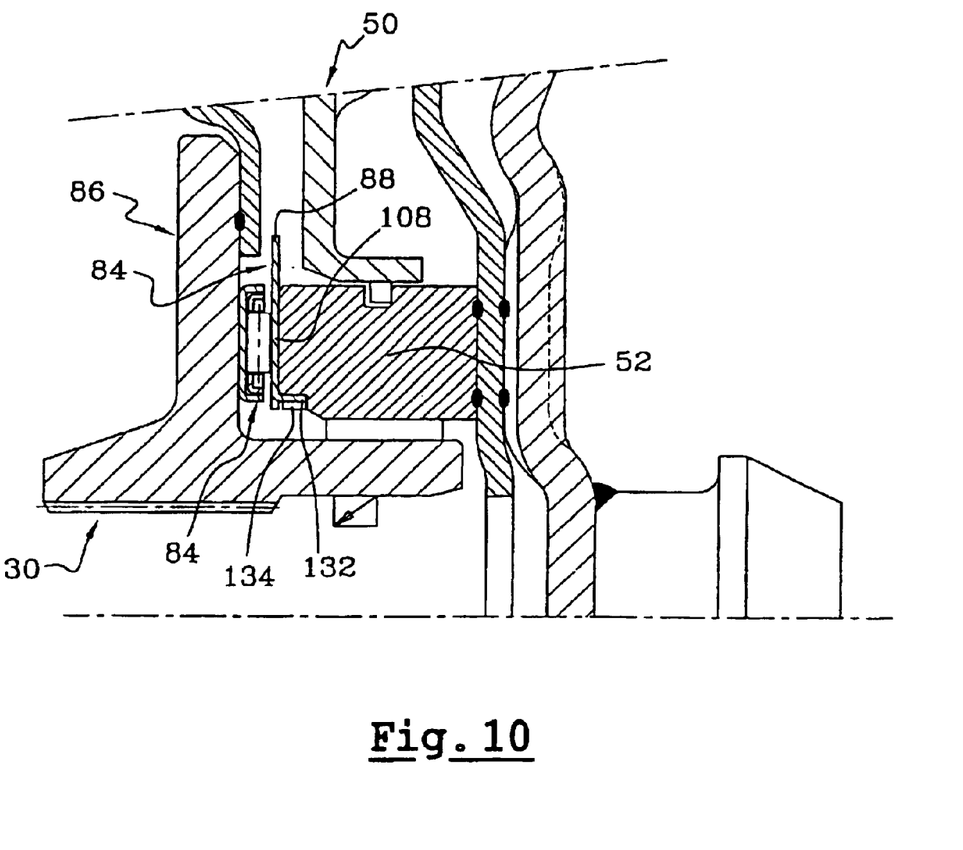

It is also possible to achieve this rotational coupling in accordance with the tenth embodiment shown in FIG. 10, in which the centring tube element 132 is made in the form of axially oriented lugs received in notches 134 of the central sleeve 52.

Figure 11:
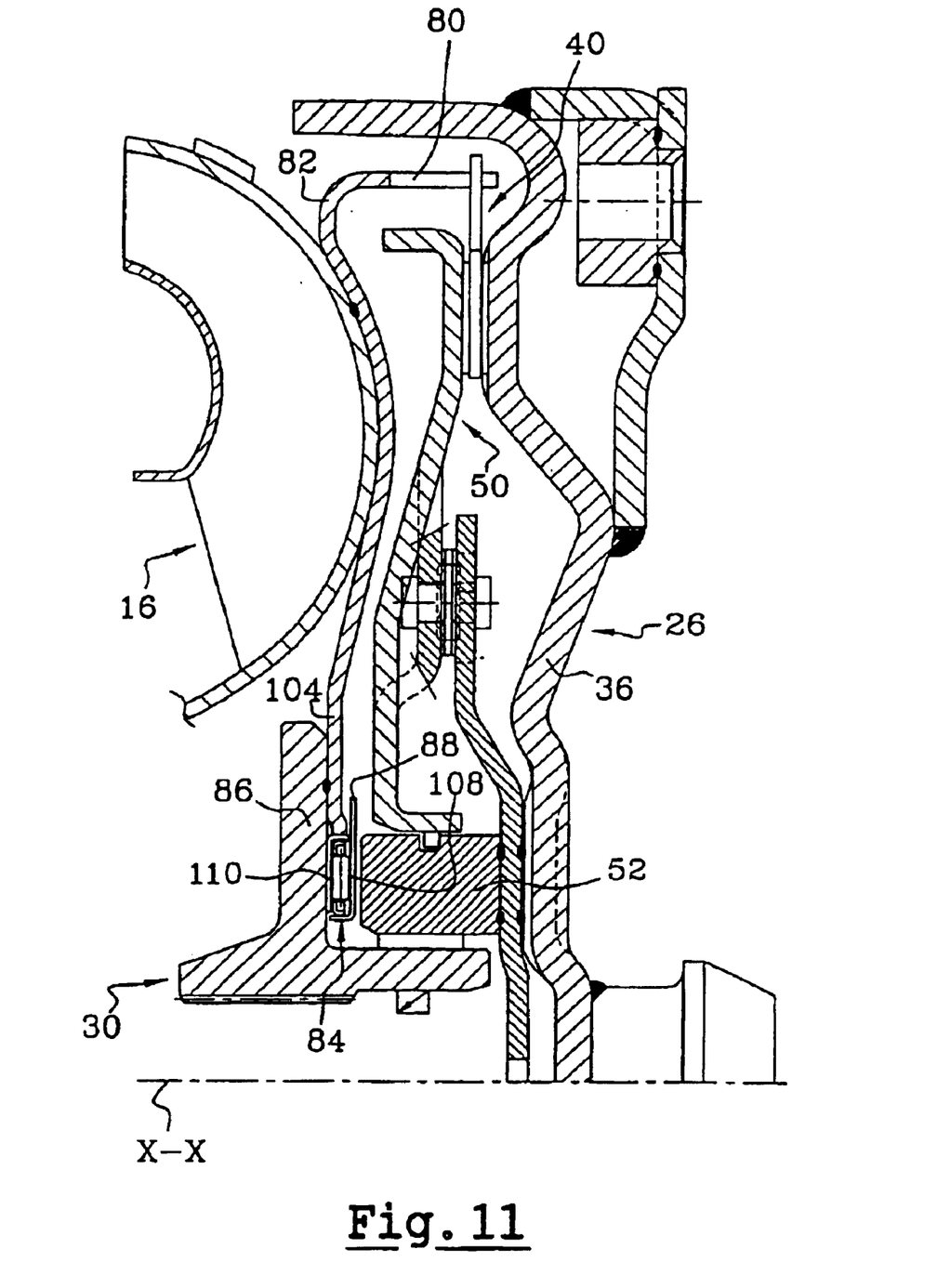

The eleventh embodiment shown in FIG. 11 is similar to the first embodiment in FIG. 1, from which it differs only in the design of the plate element 104, which is not an extension of the shell of the turbine wheel 16, but which is a separate component attached and fixed to the shell of the turbine wheel, and extended radially outwards to mesh with the disc 40 carrying the friction liners.

In accordance with the invention, radial centring means for the axial thrust bearing 84 are arranged with respect to the plate element 104 or with respect to the piston 50, 54, as illustrated in the various embodiments, or, in another version, with respect to the hub 30, 86.

The invention is not limited to the embodiments just described.

In particular, in all cases it is possible to provide complementary adhesive bonding of the front or rear ring of the needle thrust bearing 84 which is coupled in rotation to the adjacent element to which it is attached.

It is also possible to make the needle thrust bearing 84 in the form of a component which has only one ring, and which has rolling elements which roll directly against a corresponding surface of the hub 30 or central sleeve 52.

The extension which constitutes the abutment ring 88 may of course, by way of a variant which is not shown, be made as an extension of the rear ring 110 of the needle bearing 84.

The rolling bearing may also be made in the form of a ball or roller bearing.

What is claimed is:

1. A hydrokinetic coupling apparatus, for a motor vehicle, comprising:
   a casing (10) having a generally transversely oriented wall (36) adapted to be coupled in rotation to a driving shaft;
   a turbine wheel (16) including an internal plate element (104) and coupled in rotation to a hub (30) which is adapted to be counted in rotation to a driven shaft;
   a lock-up clutch (14) interposed between the turbine wheel (16) and the transverse wall (36), and including, arranged axially between the turbine wheel (16) and the transverse wall (36), a generally transversely oriented piston (50), a radially inner portion (54) of which is mounted for sliding movement along a cylindrical outer surface (58) of a central sleeve which an annular transverse rear end face (64) thereof lies facing a front transverse face of an assembly including the turbine wheel (16) and hub (30, 86); and
   a thrust bearing (84) interposed axially between the annular transverse rear end face (64) of the central sleeve and the front transverse face (102) to limit friction there between, a portion (88) of the thrust bearing extends radially outward beyond said rear end face (64) and being disposed facing a rear transverse face (51) of the radially inner portion (54) of the piston (50) so as to constitute an axial abutment defining the maximum rearward position of the piston (50) when the clutch is disengaged;
   wherein said portion 88 is formed as a ring extension (88) of a front ring portion 108 of said thrust bearing, said thrust bearing being disposed radially inward of said radially inner portion (54) of the piston (50) while ring extension portion 88 extends radially outward beyond said radially inner portion (54) of the piston (50) thereby providing said axial abutment to engaging piston 50; and
   wherein said extension (88) is formed as an elastic member provided to absorb shock when engaging piston 50.

2. Apparatus according to claim 1, wherein the abutment includes an axial bearing (84) with rolling elements, which is interposed axially between the annular transverse rear end face (64) of the central sleeve (52) and the said transverse front face (102) of the assembly consisting of the turbine wheel and hub, and at least one ring (108) of the axial thrust bearing (84) includes a radially oriented annular portion (88) which lies facing the said transverse rear face (51) of the radially inner portion (54) of the piston.

3. Apparatus according to claim 2, wherein the at least one ring (108) is at least one front ring (108) interposed axially between the central sleeve (52) and the rolling elements (106), and extending in a generally radial direction and in facing relationship with the said annular transverse rear end face (64) of the central sleeve (52), the said front ring having an annular extension (88) extending radially outwards beyond the ring (108) and having the transverse front face (89) in facing relationship with the said transverse rear face (51) of the radially inner portion (54) of the piston (50).

4. Apparatus according to claim 1, wherein the hub (30) includes a radially oriented plate portion (86) extending outwards, and in that the axial thrust bearing (84) is disposed facing the transverse front face (102) of the said plate portion (86).

5. Apparatus according to claim 4, wherein the turbine wheel (16) includes a generally radially oriented inner plate element (104), which is fixed to the plate portion (86) of the hub (30).

6. Apparatus according to claim 5 wherein the said plate element (104) of the turbine wheel (16) is adjacent to the transverse front face (102) of the plate portion (86) of the hub (30).

7. Apparatus according to claim 6, wherein the said plate element (104) of the turbine wheel (16) is interposed axially between the plate portion (86) of the hub (30) and the axial thrust bearing (84).

8. Apparatus according to claim 2, wherein the axial thrust bearing (84) includes a rear ring (110) interposed axially between the assembly having the turbine wheel (16) and hub (30, 86) and the rolling elements.

9. Apparatus according to claim 8 wherein the rear ring (110) of the axial thrust bearing (84) is centered axially with respect to one of the plate portion (86) of the hub (30), and with respect to the plate element (104) of the turbine wheel (16).

10. Apparatus according to claim 9, wherein the rear ring (110) of the axial thrust bearing (84) is centered radially with respect to the inner periphery (112) of the plate element (104).

11. Apparatus according to claim 10, wherein the rear ring (110) of the axial thrust bearing (84) is centered radially with respect to the plate portion (86) of the hub (30).

12. Apparatus according to claim 3, wherein the front ring (108) of the axial thrust bearing (84) is centered radially with respect to the radially inner portion (54) of the piston (50).

13. Apparatus according to claim 1, wherein one ring (110, 108) of the thrust bearing is coupled in rotation to one of the turbine wheel (16, 104), the central sleeve, and the piston (50).

14. Apparatus according to claim 1, wherein the thrust bearing (84) is attached axially to one of the turbine wheel (16, 104, 30), the central sleeve (52), and the piston.

15. The hydrokinetic coupling apparatus according to claim 1, wherein said thrust bearing 84 is disposed adjacent to and radially within an inner peripheral edge 112 of said plate 104.

16. A hydrokinetic coupling apparatus, for a motor vehicle, comprising:
   a casing (10) having a generally transversely oriented wall (36) adapted to be coupled in rotation to a driving shaft;
   a turbine wheel (16) including an internal plate element (104) and coupled in rotation to a hub (30) which is adapted to be coupled in rotation to a driven shaft;
   a lock-up clutch (14) interposed between the turbine wheel (16) and the transverse wall (36), and including, arranged axially between the turbine wheel (16) and the transverse wall (36), a generally transversely oriented piston (50), a radially inner portion (54) of which is mounted for sliding movement along a cylindrical outer surface (58) of a central sleeve which an annular transverse rear end face (64) thereof lies facing a front transverse face of an assembly including the turbine wheel (16) and hub (30, 86); and
   a thrust bearing (84) interposed axially between the annular transverse rear end face 64 of the central sleeve and the front transverse face (102) to limit friction there between, a portion (88) of the thrust bearing extends radially outward beyond said rear end face (64) and being disposed facing a rear transverse face (51) of the radially inner portion (54) of the piston (50) so as to constitute an axial abutment defining the maximum rearward position of the piston (50) when the clutch is disengaged;
   wherein said thrust bearing 84 is disposed adjacent to and radially within an inner peripheral edge 112 of said plate 104; and wherein said thrust bearing 84 is directly coupled to said inner edge 122 and provided with complementary engaging teeth formed in the radially inner edge 112 of the plate and a radially outer portion of a rear ring 110.

17. The hydrokinetic coupling apparatus according to claim 16, wherein said portion 88 is formed as a ring extension (88) of a front ring portion 108 of said thrust bearing, said thrust bearing being disposed radially inward of said radially inner portion (54) of the piston (50) while ring extension portion 88 extends radially outward beyond said radially inner portion (54) of the piston (50) thereby providing said axial abutment to engage piston 50.

* * * * *